(12) United States Patent
Culbertson, II et al.

(10) Patent No.: US 11,836,805 B1
(45) Date of Patent: Dec. 5, 2023

(54) SYSTEM AND METHODS FOR DETECTING HAZARDOUS CONDITIONS

(71) Applicant: United Services Automobile Association (USAA), San Antonio, TX (US)

(72) Inventors: William Preston Culbertson, II, Plant City, FL (US); Gregory David Hansen, Fuquay Varina, NC (US); Mark Anthony Lopez, Helotes, TX (US); Will Kerns Maney, San Antonio, TX (US); Keegan Patrick Hayes, San Antonio, TX (US); Steven Michael Bernstein, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 1 day.

(21) Appl. No.: 17/514,607

(22) Filed: Oct. 29, 2021

(51) Int. Cl.
  *G06Q 40/08* (2012.01)
  *G06Q 10/0635* (2023.01)

(52) U.S. Cl.
  CPC ......... *G06Q 40/08* (2013.01); *G06Q 10/0635* (2013.01)

(58) Field of Classification Search
  CPC ............................ G06Q 40/08; G06Q 10/0635
  USPC ......................................................... 705/3–44
  See application file for complete search history.

(56) References Cited

U.S. PATENT DOCUMENTS

| | | | |
|---|---|---|---|
| 9,818,158 B1* | 11/2017 | Devereaux | G06Q 40/025 |
| 10,181,159 B1 | 1/2019 | Allen et al. | |
| 10,269,076 B1* | 4/2019 | Ton-That | G06Q 50/163 |
| 10,740,847 B1* | 8/2020 | Devereaux | G06Q 30/0215 |
| 2014/0136242 A1 | 5/2014 | Weekes et al. | |
| 2014/0257862 A1 | 9/2014 | Billman et al. | |

(Continued)

OTHER PUBLICATIONS

Mihalache, Alexandra, "Wireless Home Automation System using IoTq", Faculty of Cybernetics, Statistics and Economic Informatics Bucharest, Informatica Economica 21.2: 17-32, INFOREC Association (Year: 2017).*

(Continued)

*Primary Examiner* — Frantzy Poinvil
(74) *Attorney, Agent, or Firm* — Fletcher Yoder, PC

(57) ABSTRACT

A system comprising a plurality of sensor devices configured to acquire data related to a property and a processor configured to receive the data from the plurality of sensor devices and identify one or more hazardous conditions for the property based on the data. The processor is further configured to determine an amount of risk associated with the one or more hazardous conditions and initiate verification operations to confirm the one or more hazardous conditions in response to determining that the amount of risk associated with the one or more hazardous conditions exceeds a first threshold value. The processor may also send a notification to a computing device associated with the property in response to determining that the amount of risk associated with the one or more hazardous conditions exceeds a second threshold value, wherein the notification is displayed on a display of the computing device, and wherein the notification comprises one or more recommendations to address the one or more hazardous conditions.

20 Claims, 6 Drawing Sheets

(56) References Cited

U.S. PATENT DOCUMENTS

| | | | |
|---|---|---|---|
| 2016/0163186 A1* | 6/2016 | Davidson | G06Q 50/06 |
| | | | 340/506 |
| 2017/0293301 A1* | 10/2017 | Myslinski | H04N 7/183 |
| 2020/0275266 A1* | 8/2020 | Jakobsson | H04W 4/90 |
| 2020/0394332 A1* | 12/2020 | Jakobsson | G06F 16/24573 |

OTHER PUBLICATIONS

Suresh Sankaramarayanan et al., "Smart Home Monitoring using Android and Wireless Sensors", I.J. Engineering and Manufacturing, 2014, 2, 12-30, Published Online in MECS (http://www.mecs-pres.net), available online at http://www.mecs-press.net/ijem (Year: 2014).*

* cited by examiner

SYSTEM AND METHODS FOR DETECTING HAZARDOUS CONDITIONS

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Smart home functionality is a maturing space, but the opportunity for insurance companies remains largely untapped. Currently, there are few useful early warning and loss mitigation systems that save both time and costs for property owners and insurance companies alike. With increasing availability of data indicative of aspects of an insured property, there is a demand for use of such data in facilitating insurance claim processes, providing insurance products, reducing costs for consumers, and encouraging behavior based on the use of such data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system comprises a plurality of sensor devices configured to acquire data related to a property and a processor configured to receive the data from the plurality of sensor devices and identify one or more hazardous conditions for the property based on the data. The processor is further configured to determine an amount of risk associated with the one or more hazardous conditions and initiate verification operations to confirm the one or more hazardous conditions in response to determining that the amount of risk associated with the one or more hazardous conditions exceeds a first threshold value. The processor may further be configured to send a notification to a computing device associated with the property in response to determining that the amount of risk associated with the one or more hazardous conditions exceeds a second threshold value, wherein the notification is configured to be displayed on a display of the computing device, and wherein the notification comprises one or more recommendations to address the one or more hazardous conditions.

In another embodiment, a non-transitory, computer-readable medium may include computer-executable instructions that, when executed, are configured to cause a processor to receive data related to a property from a plurality of sensor devices configured to acquire the data, identify one or more hazardous conditions for the property based on the data, determine an amount of risk associated with the one or more hazardous conditions, and initiate verification operations to confirm the one or more hazardous conditions in response to determining that the amount of risk associated with the one or more hazardous conditions exceeds a first threshold value. The processor may be further configured to send a notification to a computing device associated with the property in response to determining that the amount of risk associated with the one or more hazardous conditions exceeds a second threshold value, wherein the notification is configured to be displayed on a display of the computing device, and wherein the notification comprises one or more recommendations to address the one or more hazardous conditions.

In another embodiment, a method may include using a processor to receive data related to a property from a plurality of sensor devices configured to acquire the data, wherein the plurality of sensor devices comprises a first set of sensor devices disposed inside the property and a second set of sensor devices disposed outside of the property. The method may then include identifying one or more hazardous conditions for the property based on the data, determining an amount of risk associated with the one or more hazardous conditions, and initiating verification operations to confirm the one or more hazardous conditions in response to determining that the amount of risk associated with the one or more hazardous conditions exceeds a first threshold value. The method may then include sending a notification to a computing device associated with a user associated with the property in response to determining that the amount of risk associated with the one or more hazardous conditions exceeds a second threshold value, wherein the notification is configured to be displayed on a display of the computing device, and wherein the notification comprises one or more recommendations to address the one or more hazardous conditions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and context of embodiments of the present disclosure without limitation to the claimed subject matter.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
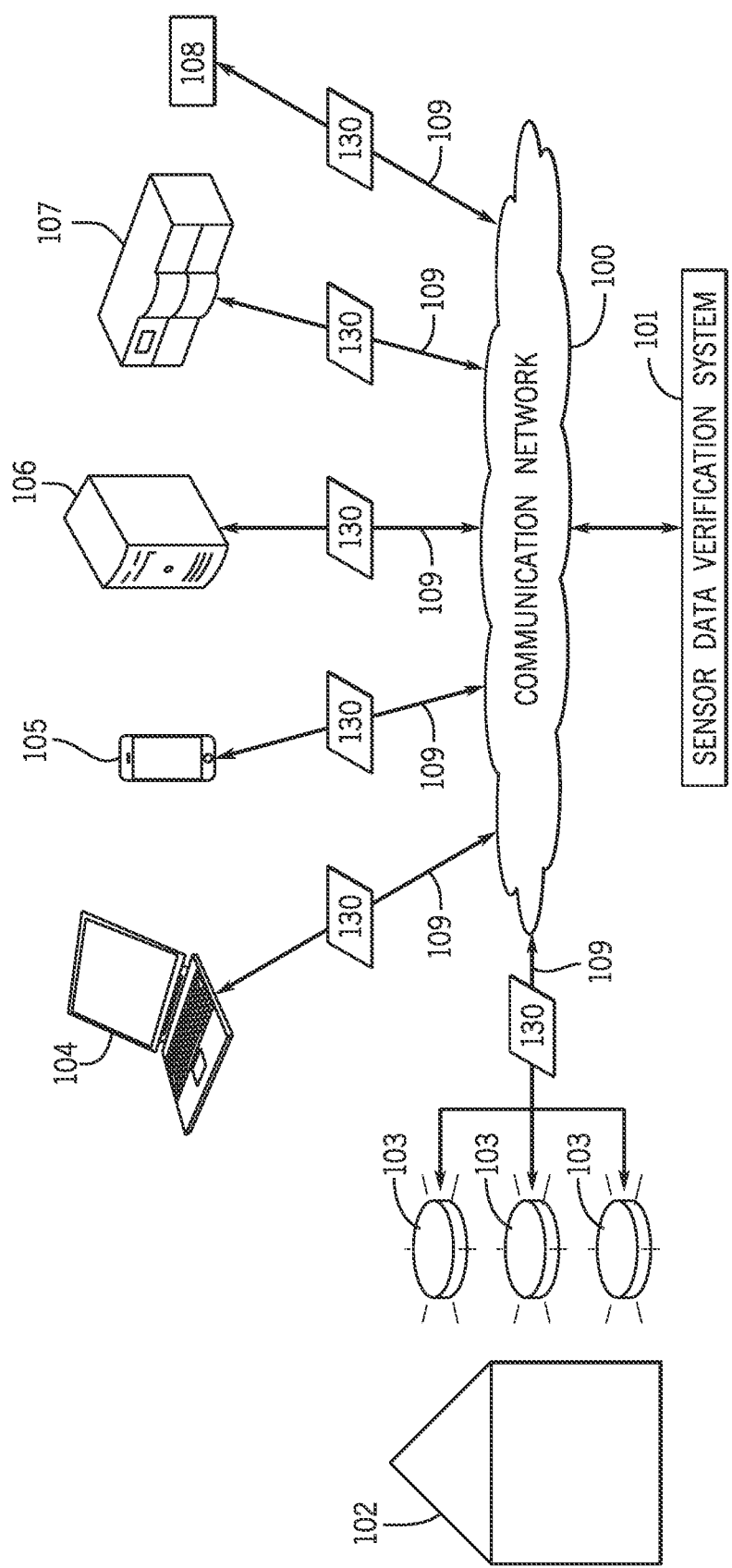
FIG. 1 illustrates a system diagram of a sensor data verification system for assessing sensor device data, in accordance with embodiments described herein.

The present disclosure relates generally to mitigating risk and/or damage related to a property by analyzing received sensor device data from various devices to detect aspects of a property that need to be addressed. More specifically, the present disclosure relates to receiving sensor device data from various sensor devices disposed in and/or around a property, integrating the sensor device data from the various sensors to identify potentially hazardous conditions of the property, and initiating a verification operation to verify whether the detected conditions are present. Further, the various sensor devices may be used to detect a member's behavior, and the sensor data may be analyzed to determine an amount of risk that may be associated with the member's behavior, thereby allowing insurance products to be generated and/or adjusted based on the amount of risk associated with the member's behavior.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

An increasing number of individuals are employing sensor devices within and around their property (e.g., residence) to capture data related to their property such that determinations can be made to assess risk, damage, and the like. Individuals may install motion sensor devices, temperature sensors, weather detection sensors, sounds sensors, and the like, and each of the sensor devices may capture and record data, and periodically send the data to the individual via a router such that the individual may be made aware of certain conditions related to the property. For example, an individual may install a motion sensor near a pool that alerts the individual when motion is detected near the pool such that an individual may determine whether immediate action should be taken to avoid or mitigate risk or damage associated with the pool. That is, an alert may notify an individual of a particular detected occurrence or potentially concerning conditions based on the sensor device data to enable the user to make a determination on how to proceed (e.g., initiate a claim process, initiate a repair process) based on the received data. However, traditional systems are inadequate at integrating and analyzing the acquired data from various sensor devices to prevent certain damage related events, implement safety procedures to reduce the likelihood of damage to a user's property, and/or offer insurance products based on the detected data.

With this in mind, the advent of systems and methods that may track, monitor, aggregate, analyze, and integrate the sensor data communicated to the individual from the sensor devices disposed inside and outside of a user's property has made interpreting the data more feasible. It is now recognized that various advantages may be gained with automated warning and detection systems that interface with the insurance company and utilize integrated sensor data acquired from various sensors to determine preventative measures that may be taken and/or to coordinate verification operations to confirm certain detected events, thereby mitigating or avoiding potential damage and/or costs associated with the damage. That is, it may be beneficial to provide systems and methods that employ various types of sensor devices that can integrate and interpret the sensor data from the various types of devices to determine whether actions need to be taken to mitigate potentially hazardous conditions. For example, data from different sensor devices may be integrated and analyzed to determine an amount of risk associated with certain detected conditions (e.g., aspects of a property), and based on the amount of risk exceeding preset thresholds, the system may alert the individual that the hazardous conditions should be addressed and/or initiate verification operations. Upon determining that a verification process should be initiated based on certain received sensor data exceeding preset thresholds and/or received sensor data indicating potentially hazardous conditions, the system may automatically initiate the verification process to mitigate an amount of damage to the individual's property and limit the risk associated with the property.

Further, the sensor devices may be used to detect a member's behavior associated with the property, thereby allowing the system to associate an amount of risk with the member's behavior. That is, the sensor devices may provide data related to a manner in which the member uses the property and/or a manner in which the member responds to certain alerts indicative of potentially hazardous conditions. For example, sensor data associated with the member's behavior may indicate that the member often (e.g., 3 times a week) leaves a stove in the kitchen on, which may be associated with an increased amount of risk. This, in turn, may be used by an insurance carrier associated with the system to offer or modify insurance products based on the amount of risk detected from the member's behavior. As another example, sensor data associated with the member's behavior may indicate that the member does not timely respond (e.g., respond within a threshold amount of time) to certain alerts generated based on detected hazardous conditions. Longer times to respond may be associated with an increased amount of risk, which in turn, may be used by an insurance carrier to modify or offer insurance products based on the member's behavior.

By way of introduction, FIG. 1 illustrates an exemplary communications network 100 in which a sensor data verification system 101 may receive sensor data from various sensor devices associated with a property. It is to be understood that the communication network 100 is a geographically distributed collection of nodes interconnected by communication links and segments for transporting data between end nodes, such as personal computers, work stations, smart home devices, sensor devices, and the like. Many types of networks are available, with the types ranging from local area networks (LANs) to wide area networks (WANs). LANs typically connect the nodes over dedicated private communications links located in the same general physical location, such as an insured property. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

FIG. 1 is a schematic block diagram of an example communication network 100 comprising various nodes/sensor devices in which the sensor data verification system 101 may receive data from various devices. In some embodiments, the sensor data verification system 101 may be any suitable computing or server device, and using data sources and nodes available to the sensor data verification system 101, the sensor data verification system 101 may receive data regarding a user's property to determine whether to initiate verifications, operations and/or alert a user associated with the property of potentially hazardous conditions to avoid or mitigate certain losses. For example, the communication network 100 may include various sensors 103 associated with a property 102, client computing devices 104 (e.g., laptops), smart devices 105 (e.g., smart phones), servers 106, routers 107, and switches 108 interconnected by various methods of communication. For instance, the links 109 may be wired links or may comprise a wireless communication medium (circuitry for wireless operation), where certain nodes are in communication with other nodes, e.g., based on distance, signal strength, current operational status, location, etc. Moreover, each of the devices can communicate data packets (or frames) 130 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

The sensors 103 may be any suitable electronic devices that are capable of measuring location, pressure, moisture, temperature, light, movement, and the like. The one or more sensors 103 may provide information and/or data about a time of an event, a location of the event, image and/or video data associated with the event, damage related to the event, and the like. The one or more sensors 103 may be disposed inside or outside of a user's property 102 and may be configured to capture data associated with the property 103. For example, a motion detection sensor may be disposed near a pool and may be configured to capture motion data associated with the pool and notify a user when motion is detected within a threshold proximity of the pool (e.g., within 3 feet), thereby allowing the user to determine whether a significant risk (e.g., child near the pool) is associated with the detected data. The various types of sensors 103 will be discussed in detail with respect to FIG. 3 below.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any tangible computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless devices, wireline, optical fiber cable, RF, etc., or any suitable combination of the foregoing.

Computer program code for carrying out operations for aspects of the present disclosure may be written in any combination of one or more programming languages, including, but not limited to, an object oriented programming language such as Java, Smalltalk, C++ or the like and conventional procedural programming languages, such as the "C++" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
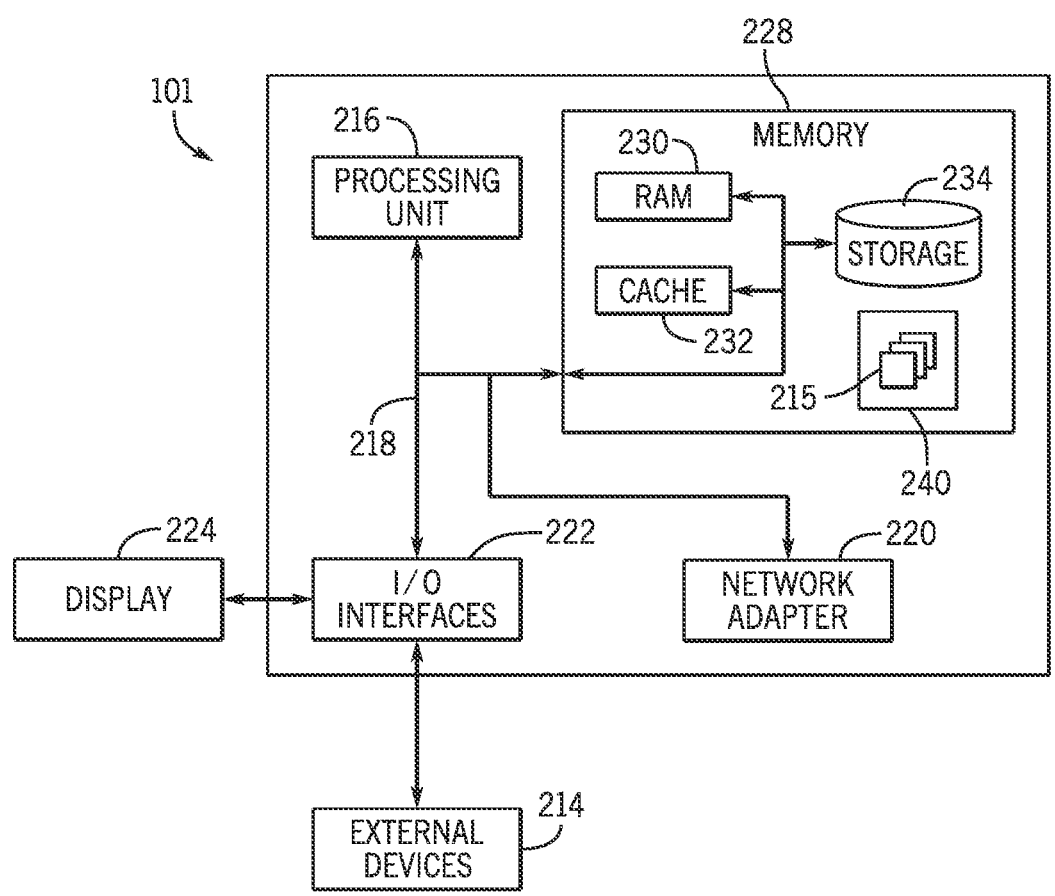
FIG. 2 illustrates a block diagram of a computing device that may be part of the sensor data verification system of FIG. 1, in accordance with embodiments described herein.

FIG. 2 is a schematic block diagram of an embodiment of the sensor data verification system 101 of FIG. 1 that may be used (or components thereof) with one or more embodiments described herein (e.g., as one of the nodes shown in the sensor data verification system 101 of FIG. 1). As explained above, in different embodiments, these various devices may be configured to communicate with each other in any suitable way, such as, for example, via communication network 100. The sensor data verification system 101 is only one example of a suitable system and is not intended to suggest any limitation as to the scope of use or functionality of embodiments of the present disclosure. That is, in some embodiments, the methods discussed herein may be performed by any suitable computing device. Regardless, the sensor data verification system 101 is capable of being implemented and/or performing any of the functionality set forth herein.

The sensor data verification system 101 is operational with and/or may include numerous other general purpose or special purpose computing system environments or configurations. Examples of well-known computing systems, environments, and/or configurations that may be suitable for use with or incorporated with the sensor data verification system 101 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The sensor data verification system 101 may be described in the general context of computer-executable instructions, such as program modules, being executed by a computer system. Generally, program modules may include routines, programs, objects, components, logic, data structures, and so on that perform particular tasks or implement particular abstract data types, and may be practiced in distributed data processing environments where tasks are performed by remote processing devices that are linked through a communications network. In a distributed data processing environment, program modules may be located in both local and remote computer system storage media including memory storage devices.

The sensor data verification system 101 is shown in FIG. 2 in the form of a general-purpose computing device. The components of the sensor data verification system 101 may include, but are not limited to, one or more processors or processing units 216, a system memory 228, and a bus 218 that couples various system components including the system memory 228 to the one or more processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The sensor data verification system 101 typically includes a variety of computer system readable media. Such media may be any available media that is accessible by the sensor data verification system 101, and it includes both volatile and non-volatile media, removable and non-removable media. The system memory 228 can include computer system readable media in the form of volatile memory, such as random access memory (RAM) 230 and/or cache memory 232. The sensor data verification system 101 may further include other removable/non-removable, volatile/non-volatile computer system storage media. By way of example only, a storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 218 by one or more data media interfaces. As will be further depicted and described below, the system memory 228 may include at least one program product having a set (e.g., at least one) of program modules that are configured to carry out the functions of embodiments of the disclosure.

Figure 3:
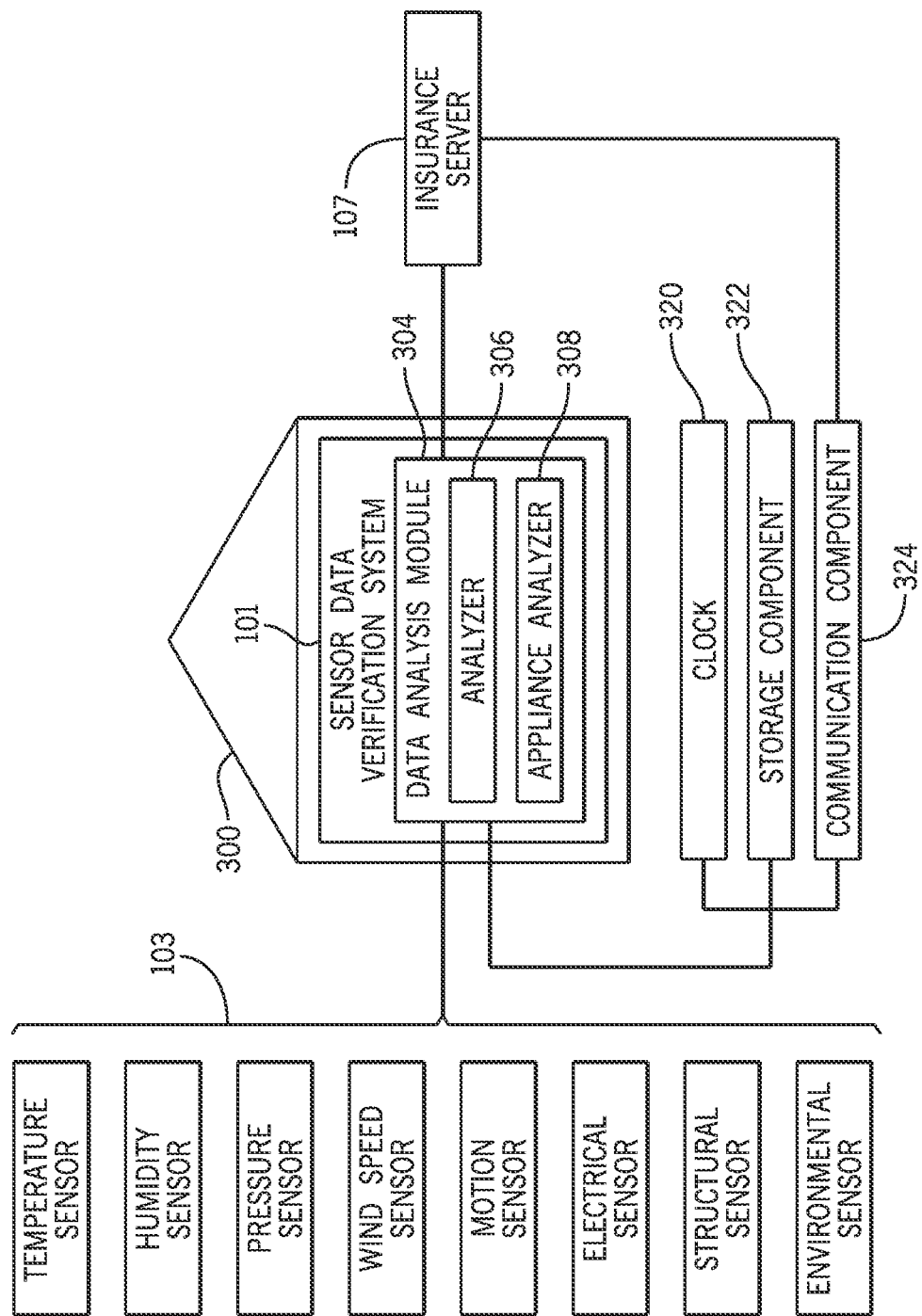
FIG. 3 illustrates a block diagram of a system and an insured property from which sensor data is captured by the system for subsequent analysis, in accordance with embodiments described herein.

Program/utility 240, having a set (at least one) of program modules 215, such as analyzer module 306 and appliance analyzer 308 depicted in FIG. 3, may be stored in the memory 228 (by way of example, and not limitation), as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the disclosure as described herein.

The sensor data verification system 101 may also communicate with one or more external devices 214 such as a keyboard, a pointing device, a display 224, and the like; one or more devices that enable a user to interact with the sensor data verification system 101; and/or any devices (e.g., network card, modem, etc.) that enable the sensor data verification system 101 to communicate with one or more other computing devices. Such communication can occur via Input/Output (I/O) interfaces 222. Still yet, the sensor data verification system 101 can communicate with one or more networks such as a local area network (LAN), a general wide area network (WAN), and/or a public network (e.g., the Internet) via network adapter 220. As depicted, the network adapter 220 communicates with the other components of the sensor data verification system 101 via the bus 218. It should be understood that although not shown, other hardware and/or software components could be used in conjunction with the sensor data verification system 101. Examples, include, but are not limited to: microcode, device drivers, redundant processing units, external disk drive arrays, RAID systems, tape drives, and data archival storage systems, and the like.

FIGS. 1 and 2 are intended to provide a brief, general description of an illustrative and/or suitable exemplary environment in which embodiments of the present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communications network 100 (FIG. 1) and the sensor data verification system 101 (FIG. 2) being generally shown and discussed above, description of certain illustrated embodiments of the present disclosure will now be provided. With reference now to FIG. 3, an example of an insured property 300 is shown (e.g., which may be the same as the property 102 of FIG. 1) which is to be understood as any type of structure (e.g., residential, commercial, retail, municipal, and the like) in which the capture and analysis of sensor data from the various sensors 103 may be useful for the reasons at least described below. The insured property 300 preferably includes the sensor data verification system 101 for receiving and analyzing captured sensor data regarding various aspects of the insured property 300, as further described below. It is to be understood that the sensor data verification system 101 may be located in any location, and its position is not limited to the example shown.

The sensor data verification system 101 is preferably configured and operational to receive (e.g., capture) sensor data from the various sensors 103 disposed within or around the property 300 regarding certain aspects (including functional and operational) of the insured property 300 and/or appliances operating within or around the insured property 300, and may transmit that captured data to a remote server 107, via communications network 100 of FIG. 1. It should be noted that the sensor data verification system 101 may perform analytics regarding the captured sensor data regarding the property 300, and the remote server 107, preferably located or controlled by an insurance company/carrier, may also perform such analytics, as further described below. It is also to be understood that in other embodiments, data from the various sensors 103 may be transmitted directly to the remote server 107, via the communications network 100.

In the illustrated embodiment of FIG. 3, the sensor data verification system 101 is shown coupled to various sensor types 103, which are described below. Although various sensor types 103 are described below and shown in FIG. 3, the sensor types described and shown herein are not intended to be exhaustive as embodiments of the present disclosure may encompass any type of sensor which facilitates the purposes and objectives of certain illustrated embodiments described herein. Exemplary sensor types include (but are not limited to):

Motion sensor—a motion sensor is one type of detection device 103 that detects motion within a detection range. Thus, the motion sensor 103 may be placed to detect when people, animals and/or objects move within the motion sensor's field of vision. Another type of sensor 103 may sense motion in the structure to which sensor 103 is attached. For example, the motion sensor 103 may detect vibrations indicative of certain types of motion. Although large structures (e.g., buildings) typically do not move by a substantial amount, in the event of an earthquake, flood, damage to part of the structure, and/or other devastating event, the motion sensor 103 may detect the movement of the large structure itself.

Temperature sensor—a temperature sensor 103 detects the temperature of the desired medium. Thus, the temperature sensor 103 may be configured to measure the temperature of air or of a specific surface (e.g., the surface to which temperature sensor 103 is attached). It is contemplated herein that the temperature sensor 103 may be placed outside the structure (e.g., on an outside wall and/or the roof), inside the structure (e.g., on an interior wall, an interior ceiling, an interior floor, a basement, an attic, a kitchen, a bathroom, a bedroom, a workspace, etc.), or at a boundary therebetween. The temperature sensor 103 may also be associated with an appliance (e.g., refrigerator, stove, oven, grill, barbeque pit, and the like).

Sound sensor—a sound sensor 103 detects the presence of various ambient noises. Thus, the sounds sensor 103 may be configured to detect various noises related to structural components (e.g., appliances) within or around the property 300 which may be indicative of operating parameters and the like. Further, the sound sensors 103 may be configured to detect the presence of certain weather events. For example, a sound sensor 103 may detect thunder from the outside environment and based on a decibel level, the sound sensor 103 may determine a distance the storm is from the sensor 103. Further still, the sound sensors 103 may be configured to detect any other noises that may be related to the property 300. For example, the sound sensor 103 may detect a noise associated with a something breaking (e.g., a tree limb or window), which may be indicative of a potentially hazardous condition (e.g., tree branch about to fall). The sound sensor 103 may also detect the presence of a person based on captured speech or the sound of movement.

Humidity sensor—as with other sensors 103, a humidity sensor 103 may be placed anywhere inside/outside/on the structure as recognized by those skilled in the art. The humidity sensor 103 may detect a level of humidity or merely the presence of humidity beyond or below a certain threshold.

Gas detection sensor—a gas detection sensor 103 may function to detect the presence of one or more gasses. As with other sensors 103, the gas detection sensor 103 may be placed anywhere inside/outside/on a structure as recognized by those skilled in the art. For exemplary purposes only and without limitation, the gas detection sensor 103 may be configured to detect the presence of carbon monoxide (or any other harmful gasses, such as radon), oxygen, and/or methane (or any other flammable gasses). Further, the readings may be binary (e.g., either the gas is present or it is not present), or the readings may be quantitative (e.g., the percentage of air that comprises the gas, parts per million of the gas).

Smoke detector sensor—a smoke detector sensor 103 detects the presence of smoke. As with other sensors 103, the smoke detection sensor 103 may be placed anywhere inside/outside/on the structure as recognized by those skilled in the art. The readings of the smoke detection sensor 103 may be binary (e.g., either a gas composition is present or it is not present), or the readings may be quantitative (e.g., the percentage of air that comprises smoke, parts per million of smoke).

Water pressure sensor—a water pressure sensor 103 detects water pressure levels at one or more locations within a structure. Water pressure sensors 103 may be placed anywhere inside or outside a structure (e.g., a house) and thus may provide information related to the stresses being induced upon the structure's plumbing system and/or irrigation system. This information may be utilized by the sensor data verification system 101 to indicate a plumbing system or irrigation system that is operating close to stress limits, and thus, a structure for which water damage may be more likely.

Water flow sensor—a water flow sensor 103 detects the amount of water flowing through one or more selected points in the plumbing system (which includes but is not limited to water lines, sewer lines, an HVAC system, appliances, fire suppression systems, lawn sprinklers, and sump pumps) and/or an irrigation system. The water flow sensor 103 may be placed anywhere inside or outside a structure and thus may provide information related to the amount of water being routed to the structure, and more particularly, which parts of the structure are receiving exactly (or approximately) how much water. It is contemplated herein that water flow sensors 103 may detect, for exemplary purposes only and without limitation, hot water in a water heater, hot water input pipes, cold water input pipes, and/or output pipes (e.g., pipes removing utilized water).

Water detection sensor—a water detection sensor 103 operate to detect water in any of various ways. A water system may detect an amount of water escaping through selected points throughout a plumbing system (which includes but is not limited to water lines, sewer lines, the HVAC system, appliances, fire suppression systems, lawn sprinklers, and sump pumps). The water detection sensor 103 may be placed anywhere inside a structure and thus may provide information related to water escaping and accumulating inside the structure, which parts of the structure have water accumulation and how much water. It is contemplated herein that water detection sensors 103 may detect, for exemplary purposes only and without limitation, flood waters entering from exterior to interior of the structure, interior water leaks, water overflows (e.g., water overflow from sump pump(s)), water from backed up drains, water from broken pipes and/or sewer/water back-ups, and the like.

Wind speed sensor—a wind speed sensor 103 may operate to detect wind speed at a location. The location for detecting the wind speed may be determined by sensor placement. The wind speed sensor 103 may be placed anywhere inside or outside the structure.

Air pressure sensor—an air pressure sensor 103 may be placed anywhere inside or outside of a structure to detect pressure information. This pressure information may be analyzed, for example, to determine how quickly and easily the structure equalizes air pressure changes to the outside ambient air. As another example, a rapid change in air pressure identified through analysis of the pressure information may indicate certain activities (e.g., opening of a door in a structure to surroundings).

Electrical system sensor—an electrical system sensor 103 may operate to detect operational parameters of a structure's electrical system. Readings from the electrical system sensor 103 could be used to determine if a voltage is (persistently) too high, too low, or if the voltage frequently drops and/or spikes. Such conditions may suggest that the structure 300 is at risk for fire. Other types of electrical measurements could be taken, such as readings of current flowing through the electrical system. Still other types of electrical measurements could be determined, including measurements indicative of how energy is used and at what times of day it is used, etc.

Structural sensor—a structural sensor 103 may operate to detect (changing) conditions of the structure's elements (e.g., support beams, floors, ceilings, roofs, walls, etc.). Structural readings from one or more locations inside and/or outside the structure could thus be recorded by sensor 103 and transmitted to the sensor data verification system 101. The structural sensor 103 may identify stresses, movement, changes in shape, and other aspects of a structure.

Environmental sensor—an environmental sensor 103 may be configured to detect various environmental conditions relating to a structure (e.g., structure 300), such as air quality present in the structure, the presence of mold/bacteria/algae/lead paint or any contaminant adverse to human health (whether airborne or attached to a portion of the structure).

Camera Sensor—a camera sensor 103 may include a visible light camera, infrared camera, two-dimensional (2D) camera, three-dimensional (3D) camera, thermal camera, aerial imagery, radar-capable sensor, sensor that detect other wavelengths, and/or any combination thereof.

Weather detection sensor—a weather detection sensors 103 (e.g., mini-weather stations) may include one or more of the types of sensors described above (e.g., temperature, air pressure, humidity, wind speed, motion, sound sensors, and the like) and may be configured to detect various weather conditions and/or events. In some embodiments, the weather detection sensor 103 may use sensor data to determine an upcoming weather event. For example, changes in air pressure, wind speed, and air temperature may be indicative of an upcoming storm, which may suggest that a structure is at risk for damage.

Multi-function computing devices—a multi-function computing device 103 may include, for exemplary purposes only and without limitation, smart phones, tablets, cellular phones, laptops, desktops, webcams, smart TV camera devices (and other appliance camera devices), and/or similar devices. Such multi-function computing devices 103 may passively contribute (e.g., periodically gather information and communicate it to the sensor data verification system 101 without user action) and/or actively contribute (e.g., the user must proactively gather data and/or proactively send the data after it has been gathered, the gathering being proactive and/or passive).

With exemplary sensors 103 identified and briefly described above, and as will be further discussed below, it is to be generally understood that sensors 103 may capture and analyze certain parameters relating to the structure 300 to determine preventative maintenance issues; identify potentially hazardous conditions; and initiate verification operations to mitigate damage and/or potential losses. It is to be understood and appreciated that the aforementioned sensors 103 may be configured as wired and/or wireless types integrated into a networked environment (e.g., WAN, LAN, WiFi, 3G, LTE, and the like), which may also have an associated IP address. It is to be further appreciated that the sensors 103 may consist of internal sensors located within the structure of the property 300; external sensors located external of the structure of the property 300; sound sensors for detecting ambient noise (e.g., for detecting termite and rodent activity, glass breakage, intruders, and the like); camera sensors such as those consisting of camera stand-alone devices, or by integrating into existing camera devices in the property 300. It is additionally to be understood and appreciated that the sensors 103 can be networked into a central computer hub (e.g., sensor data verification system 101) in an insured property to aggregate and analyze collected sensor data packets. Aggregated data packets can be analyzed in either the sensor data verification system 300 or via an external computer environment (e.g., server 106). Additionally, it is to be understood that data packets collected from sensors 103 can be aggregated into the sensor data verification system 101 and be sent as an aggregated packet to server 106 for subsequent analysis whereby data packets may be transmitted at prescribed time intervals (e.g., a benefit is to reduce cellular charges in that some insured properties 300 may not have Internet access or cellular service as backup when an Internet service is nonfunctioning).

In accordance with an illustrated embodiment, in addition to the aforementioned, the sensors 103 being utilized relative to the property 300, the sensor data verification system 101 may additionally be coupled to a clock 320 which may keep track of time for the various sensor devices 103, thereby allowing a given item of data to be associated with the time at which the data was captured. For example, the sensor data verification system 101 may recurrently receive data from the various sensors 103 related to temperature, wind speed, humidity, and the like, and may timestamp each reading. The time at which the readings are taken may be used to reconstruct events or for other analytic purposes, such as those described below. For example, the timestamps on wall structure readings taken by a structural sensor during a weather event (e.g., hurricane) may allow it to be determined, while the hurricane is occurring or after the hurricane has occurred, if verification operations should be initiated to mitigate losses associated with the hurricane. In another example, the timestamps on certain sensor readings may be used to determine an amount of time taken for a user to respond to an alert, thereby allowing the sensor data verification system 101 to offer and/or modify insurance products accordingly.

A storage component 322 may further be provided and utilized to store data readings and/or timestamps in the sensor data verification system 101. For example, the storage component 322 may comprise, or may otherwise make use of, magnetic or optical disks, volatile random-access memory, non-volatile random-access memory, or any other type of storage device. There may be sufficient data storage capacity to store several hours or several days worth of readings. For example, there might be various plumbing issues which can affect the water pressure in a plumbing system to be low. The storage component 322 might have sufficient storage capacity to allow, for example five days of readings to be stored, thereby allowing the sensor data verification system 101 to narrow down the cause of low water pressure. As additional sensor data from various sensors 103 around the property is captured and stored in the storage component 332, the sensor data verification system 101 may analyze the stored data to identify potentially hazardous conditions and/or determine whether to initiate verification operations to mitigate potential losses, as described in greater detail below A communication component 324 may further be provided and utilized to communicate recorded information from the sensor data verification system 101 to an external location, such as the server 107, which may be associated with an insurance carrier. The communication component 324 may be, or may comprise, a network communication card such as an Ethernet card, a WiFi card, or any other communication mechanism. However, the communication component 324 could take any form and is not limited to these examples. The communication component 324 might encrypt data that it communicates, in order to protect the security and/or privacy of the data. The communication component 324 may communicate data recorded by the sensor data verification system 101 (e.g., data stored in storage component 322) to an external location, such as the server 107. For example, server 107 may be operated by an insurance company, and may collect data from the sensor data verification system 101 in order to learn about maintenance/repair needs and other analytics relative to the property 300 in which the sensor data verification system 101 is located. The communication component 324 may initiate communication sessions with the server 107. Or, as another example, the server 107 may contact the sensor data verification system 101, through the communication component 324, in order to receive data that has been stored by the sensor data verification system 101. Additionally, data from the sensors 103, the clock 320 and/or the storage component 322 may be communicated directly to the server 107, via the network 100.

In the example of FIG. 3, the sensor data verification system 101 may include a data analysis module 304, which may analyze data in some manner. The data analysis module 304 may comprise various types of sub-modules, such as analyzer 306 and appliance analyzer 308. In general, the analyzer 306 may perform an analysis of collected data regarding various aspects of the property 300, such as data that can be used to identify potentially hazardous conditions and determine whether verification operations should be initiated. The appliance analyzer 308 may perform an analysis of collected data regarding various appliances located in or around the property 300, such as their age, operating parameters, maintenance/repair issues, and the like. The analyzer 306 and the appliance analyzer 308 may overlap somewhat in terms of the techniques they employ (e.g., both of these sub-modules may analyze sensor data such as temperature, humidity, and the like, and attempt to draw some conclusions based on whether and/or how this data has changed over time).

Figure 4:
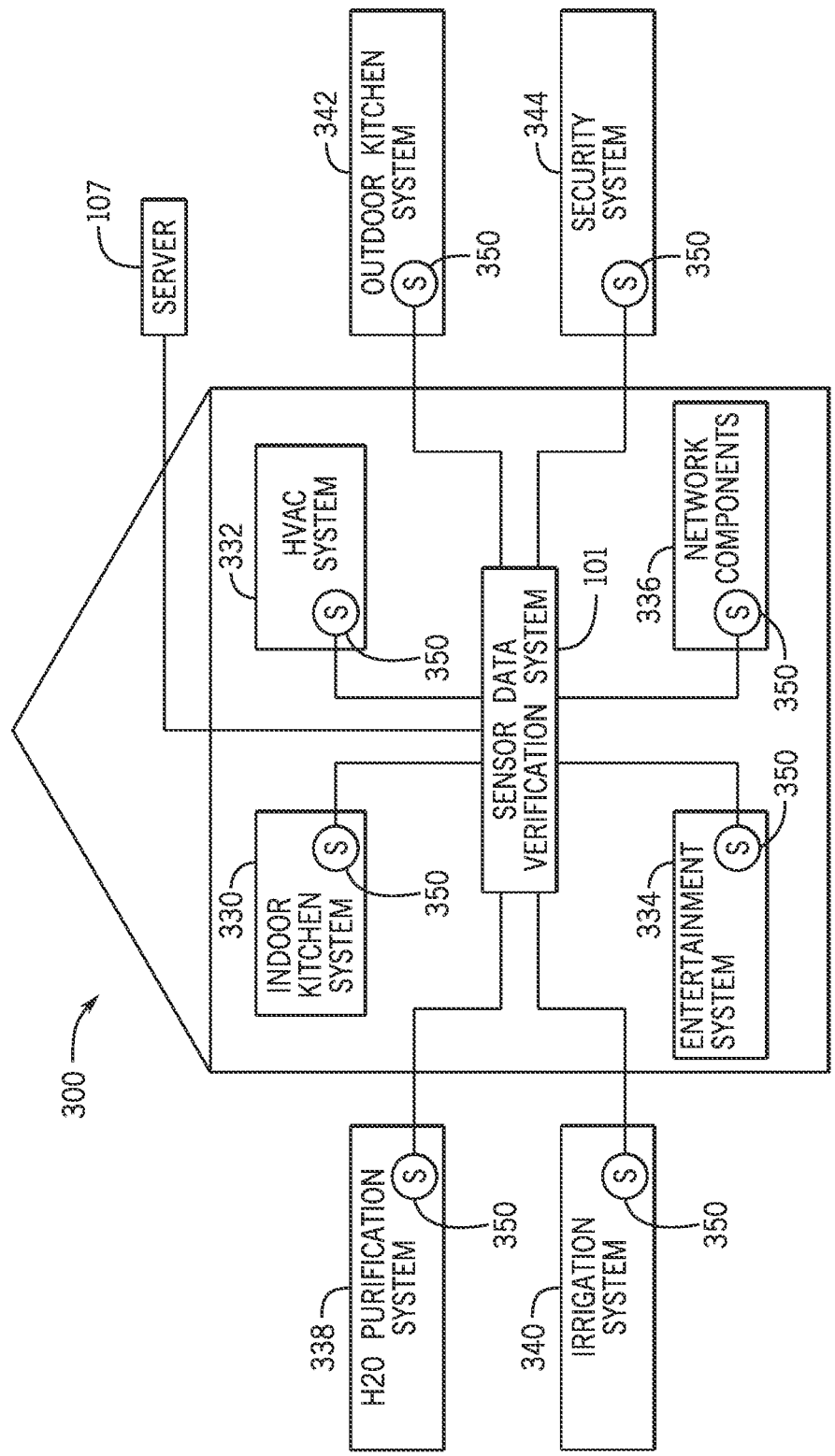
FIG. 4 illustrates a block diagram of a plurality of appliances and systems located inside or in the vicinity of an insured property from which sensor data is captured for subsequent analysis, in accordance with embodiments described herein.

As previously noted, the property 300 may contain a plurality of appliances located therein or in its vicinity. FIG. 4 is a block diagram illustrating such appliances from which sensor data is captured for subsequent analysis in accordance with an illustrated embodiment. The sensor data verification system 101 and elements such as the clock 320, the storage component 322 and the communication component 324, as well as sub-modules of data analysis module 304 have already been described with respect to FIG. 3. Those elements are not further described with respect to FIG. 4. In addition to those elements already described, illustratively, a plurality of systems with various appliances are depicted in FIG. 4. Examples of appliances and/or appliance systems include (but are not limited to) all kitchen appliances (e.g., refrigerator, freezer, stove, cooktop, oven, grill, dishwasher, etc.) of an indoor kitchen system 330; HVAC components 332 (air conditioner, heating system, air handlers, humidifiers/de-humidifiers, etc.), media entertainment system 334 (e.g., televisions), networking components 336 (routers, switches, extenders, etc.), water purification system 338, irrigation system 340 (e.g., sprinklers), outdoor kitchen system 342 (e.g., barbeque pit, gas grill, refrigerator, etc.), security system 344 (e.g., cameras, motion sensors), electrical generator system, plumbing system, and the like. In many of the embodiments, appliances 330, 332, 334, 336, 338, 340, 342, 344 have a computer based architecture or a controller that enables communication of data concerning the electronic appliance. It is to be understood that appliances 330, 332, 334, 336, 338, 340, 342 and 344 may be located in any location inside or outside of the property 300, and their positions are not limited to the example depicted in FIG. 4. In addition, a plurality of appliance sensors 350 may be attached to and/or operatively connected to controllers of appliances 330, 332, 334, 336, 338, 340, 342, 344. The appliance sensors 350 may be the same as the sensors 103 described above with respect to FIG. 3.

Each of the appliance sensors 350 may be configured and operational to preferably detect various operating parameters relating to appliances 330, 332, 334, 336, 338, 340, 342, 344 within or outside the property 300. An appliance sensor 350 may comprise detection hardware, or may employ one or more remote probes, which may be located inside and/or outside the property 300. The appliance sensor 350 may be functional to detect certain operating parameters of appliances 330, 332, 334, 336, 338, 340, 342, 344. Operating parameters detected by an appliance sensor 350 may include (but are not limited to): the operating efficiency of an appliance (energy usage, output performance); the time an appliance operates, the age of an appliance. Such appliance readings from one or more appliances 330, 332, 334, 336, 338, 340, 342, 344 could thus be recorded by the sensor data verification system 101 and used by the appliance analyzer 308 in various ways. It is additionally to be understood and appreciated that the appliance sensors 350 can also be networked into a central computer hub (e.g., the sensor data verification system 101) in an insured property to aggregate collected sensor data packets, and the sensor data verification system 101 may communicate its data to the server 107.

Figure 5:
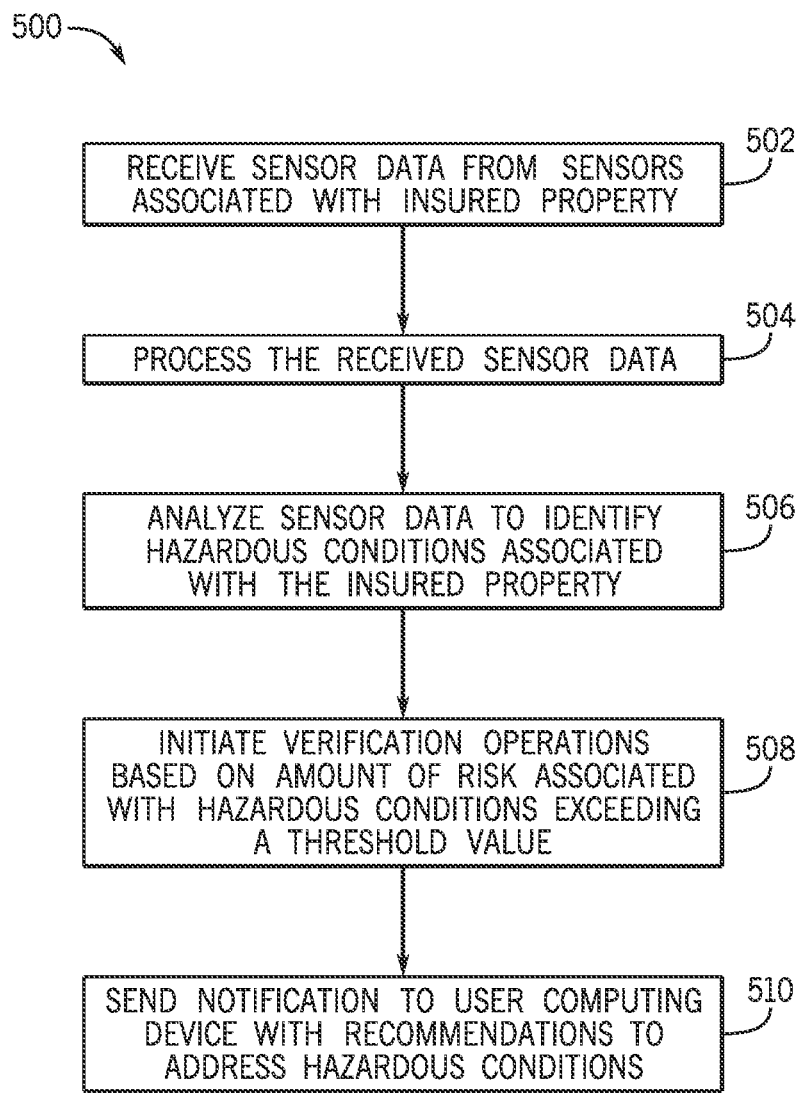
FIG. 5 illustrates a flow diagram of a method for identifying hazardous conditions associated with an insured property, in accordance with embodiments described herein.

With the foregoing in mind, FIG. 5 illustrates a flow chart of a method 500 employed by the sensor data verification system 101 for identifying hazardous conditions associated with a property using detected sensor data from various sensor devices 103, alerting an individual associated with the property of the hazardous conditions, and initiating verification operations to confirm the hazardous conditions. Although the following description of the method 500 is described in a particular order, it should be noted that the method 500 is not limited to the depicted order; and instead, the method 500 may be performed in any suitable order. In addition, although the sensor data verification system 101 is described as performing the method 500, it should be understood that the method 500 may be performed by any suitable computing device.

Referring now to FIG. 5, at block 502, the sensor data verification system 101 preferably receives and collects data from the various sensors 103 associated with the insured property 300. As noted above, the various sensors 103 may be located within the insured property 300 or within a threshold distance of the insured property 300 and may be configured to capture data associated with the insured property 300. In an embodiment of the present disclosure, at block 502, the sensors 103 may periodically capture sensor data associated with the insured property according to a data capture frequency value, and may send the captured sensor data at prescribed time intervals (via network 100) to the sensor data verification system 101. It is to be understood that data collected from the sensors 103 may be aggregated into data packets, and may be sent as an aggregated data packet 130 to the sensor data verification system 101 for subsequent analysis.

At block 504, the sensor data verification system 101 processes the received data. For example, the sensor data verification system 101 may include a parser configured to parse the aggregated data packet 130 received from the sensors 103, and classify the received data based on, for example, a type of sensor employed to collect a particular sub-set of the received sensor data. The sensor data verification system 101 may further create a data structure for each classification. In some embodiments, the sensor data verification system 101 may employ machine learning models housed and stored on the sensors 103, the processor 216, and/or a network cloud to process the received data. The machine learning models may be used to leverage higher computer capacity, and analyze received sensor data to predict whether a hazardous condition is present, as described in greater detail below. Further, at block 504, the sensor data verification system 101 may identify a policy holder associated with the insured property 300 from which the received data is collected.

At block 506, based on data collected from the various sensors 103 regarding an insured property 300, the sensor data verification system 101 (e.g., via analyzer 306 or appliance analyzer 308) may integrate the collected data from numerous different sensors and conduct an analysis to identify hazardous conditions associated with an aspect of the insured property 300, thereby allowing the sensor data verification system 101 to determine recommendations to address the hazardous conditions. Further, at block 506, the sensor data verification system 101 may determine an amount of risk (e.g., a probability of damage to the insured property) associated with the hazardous conditions. For instance, a pressure sensor associated with the irrigation system 340 may indicate that the irrigation system 340 has a water pressure below a threshold value despite being inoperative, and a sound sensor disposed within a threshold distance of the pressure sensor may be indicative of water flowing in the backyard area. Based on the pressure being below the threshold value and the sound data indicative of water flowing in the backyard, the sensor data verification system 101 may determine that a sprinkler head is broken in the backyard, which may be a potentially hazardous condition depending on the environmental conditions present at the time the determination is made. For example, during dry conditions, a broken sprinkler head may not be associated with an increased risk of damage to the insured property because the backyard is not at a high risk of flooding (e.g., due to the dry conditions). However, during wet conditions (e.g., existing conditions or an upcoming weather event), the backyard may be more susceptible to flooding, which may be associated with an increased risk of damage. In some embodiments, the sensor data verification system 101 may also receive environmental data from a weather detection sensor associated with the insured property such that the sensor data verification system 101 can make the proper determinations about the environmental conditions. That is, the sensor data verification system 101 may receive additional sensor data from associated temperature, humidity, and moisture sensors such that the sensor data verification system 101 can identify exiting conditions and/or upcoming weather events that may place the insured property at risk of damage. Using the data from the various different sensors enables the sensor data verification system 101 to make determinations based on an amount of risk associated with detected conditions. Thus, when environmental conditions are dry (e.g., less than a threshold amount of rain over a threshold period of time) the sensor data verification system 101 may determine that an amount of risk associated with the broken sprinkler is below a threshold value (e.g, less than a 10% chance of flooding based on detected conditions). However, if the environmental conditions are wet, (e.g., more than a threshold amount of rain over a threshold period of time) the sensor data verification system 101 may determine that an amount of risk associated with the broken sprinkler head is greater than a threshold value (e.g., greater than a 10% chance of flooding), and further may make recommendations to address the broken sprinkler head within a prescribed time threshold to mitigate damage to the insured property.

As another example, a sound sensor located near a tree on the property may detect sounds indicative of structural problems associated with the tree (e.g., tree branch is about to break). Further, weather detection sensors may detect that a storm is in the area and is approaching the user's property. The weather detection sensors may be indicative of increasing wind speeds, increasing rain fall, and the like, which may increase the likelihood of the tree branch breaking, thereby enabling the sensor data verification system 101 to identify the tree as a potentially hazardous condition. That is, an amount of risk (e.g., 5% chance of damage to user's property) may be associated with the detected hazardous condition (e.g., the faulty tree), and the sensor data verification system 101 may determine to make recommendations to address the hazardous condition (e.g., trim the tree branch before it breaks) within a threshold amount of time (e.g., within 1-2 days) to mitigate damage to the owner's property. Further, in some embodiments, a motion or proximity sensor disposed on the property may detect a vehicle parked or located within a threshold distance of the tree having structural problems. As noted above, the sensor data verification system 101 may have already identified the tree as a potentially hazardous condition that has a 5% chance of damaging the user's property without involving the vehicle. However, upon detecting that a vehicle is parked within a threshold distance of the tree, the sensor data verification system 101 may adjust the amount of risk associated with the hazardous conditions (e.g., the faulty tree branch). That is, an increased amount of risk (e.g., 50% chance of damage) may be associated with the vehicle located within a threshold distance of the tree because a falling branch may damage the user's vehicle. Thus, the sensor data verification system 101 may recommend to address the hazardous condition within a shorter threshold of time (e.g., 1-2 hours) to mitigate damage to the insured property. It should be noted that the sensor data verification system 101 may continuously monitor, share, and combine the data from the various sensor devices disposed both inside the structure and outside of the structure to determine and/or associate an amount of risk with detected hazardous conditions. As certain aspects associated with the insured property change (e.g., changing environmental conditions, pieces of property changing locations, and the like), the sensor data verification system 101 may provide recommendations based on updated or adjusted amounts of risk associated with the changing conditions.

In some embodiments, the sensor data verification system 101 may recommend different time thresholds based on the amount of risk associated with the detected conditions. That is, if the amount of risk associated with detected hazardous conditions is below a threshold value (e.g., less than 10%), the sensor data verification system 101 may recommend to address the detected hazardous conditions within a longer threshold of time (e.g., 2-3 weeks—hazardous condition that does not need to be addressed urgently) to mitigate damage to an insured property. However, if the amount of risk associated with the detected hazardous conditions is above a threshold value (e.g., greater than 50%), the sensor data verification system 101 may recommend to address the detected hazardous conditions within a shorter threshold of time (e.g., 1-2 days—hazardous condition does need to be addressed urgently). Thus, the amount of risk associated with the detected hazardous condition may be inversely proportional to the amount of time recommended to address the hazardous condition, such that higher amounts of risk are associated with shorter recommended amounts of time to address the hazardous conditions.

Upon identifying hazardous conditions associated with the insured property, at block 508, the sensor data verification system 101 may automatically initiate verification operations based on an amount of risk associated with the identified hazardous conditions exceeding a threshold value (e.g., greater than 5% chance of damage). That is, upon determining that an amount of risk associated with certain detected conditions exceeds a threshold value, the sensor data verification system 101 may deploy an unmanned aerial vehicle (UAV) or a drone (e.g., image capturing device) to capture image and/or video data associated with the property, thereby allowing the sensor data verification system 101 to confirm the detected hazardous conditions. In some embodiments, the verification operations may include sending a representative of the insurance company (e.g., a claim assessor) to confirm detected hazardous conditions. Further, in some embodiments, the sensor data verification system 101 may modify or update a data capture frequency value of the various sensor devices in response to determining that the amount of risk associated with the detected hazardous conditions exceeds a threshold value, thereby enabling the sensor data verification system 101 to more frequently capture data associated with the detected hazardous conditions.

At block 510, the sensor data verification system 101 may also send a notification to a computing device associated with an owner of the insured property based the amount of risk associated with the identified hazardous conditions exceeding the threshold value. In some embodiments, the notification may cause the computing device to automatically open an application and display a visualization that presents the hazardous conditions and includes an indication of one or more recommendations to address the hazardous conditions associated with the property within a threshold amount of time to mitigate damage to the insured property. For instance, using the example above, the notification may notify the user that a broken sprinkler head is present in the backyard and may provide a recommendation to repair the broken sprinkler head within a threshold amount of time to mitigate a risk of damage associated with the property. The notification may cause the computing device to activate despite the computing device being inoperative or in a sleep mode, thereby allowing the user to be notified of potentially hazardous conditions in real-time. Further, the notification may provide a link to an insurance company associated with the insured property, thereby allowing the owner to initiate a claim process to address the detected hazardous conditions. In some embodiments, the notification may also provide an indication that a failure to address the hazardous conditions may be associated with changes to the user's insurance policy, as described in greater detail below.

Figure 6:
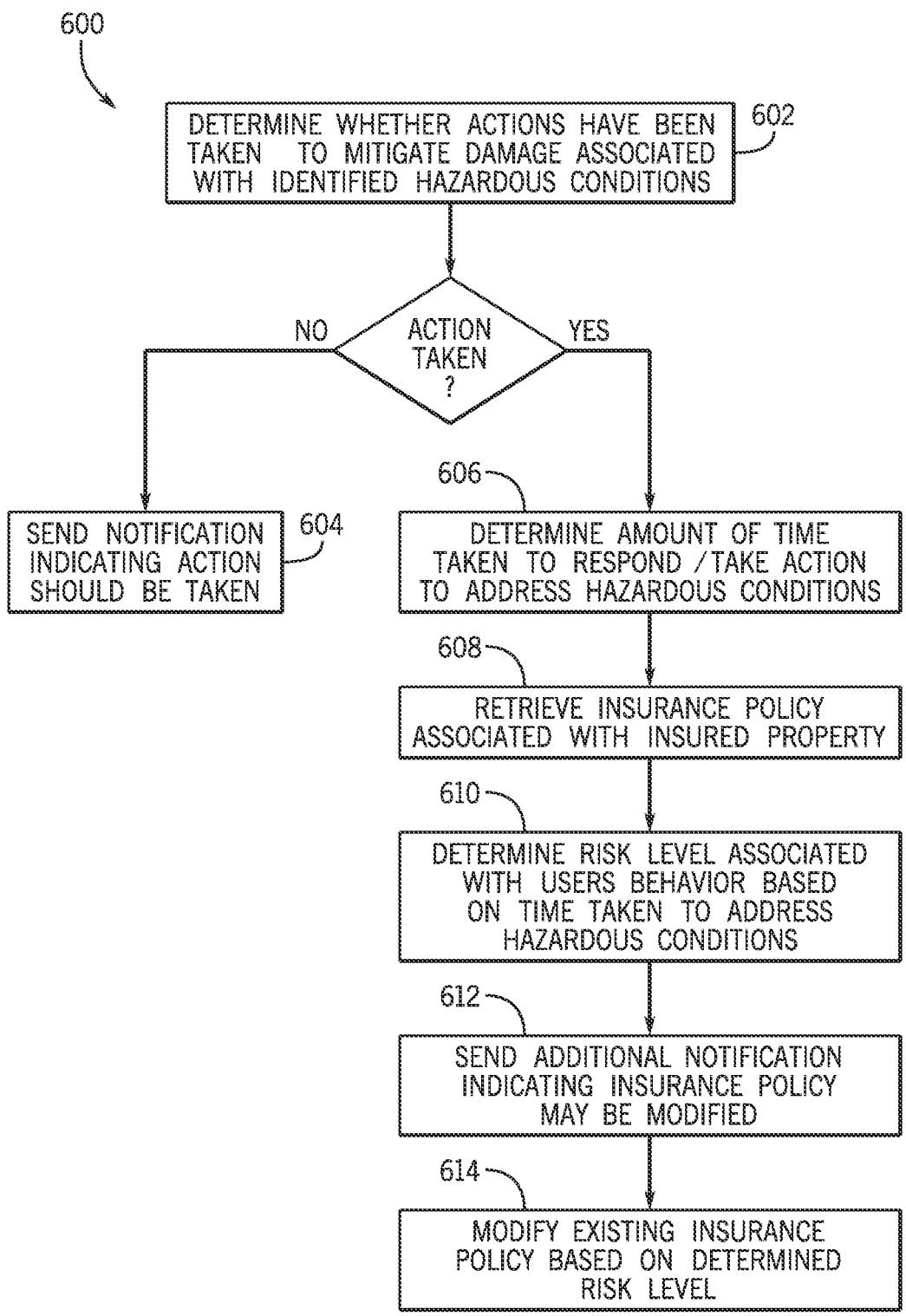
FIG. 6 illustrates a flow diagram of a method for modifying insurance products based on a risk level associated with a user's behavior, in accordance with embodiments described herein.

FIG. 6 illustrates a flow chart of a method 600 for offering and/or modifying insurance products based on a risk level associated with the manner in which an individual associated with the property lives (e.g., individual's behavior). Although the following description of the method 600 is described in a particular order, it should be noted that the method 600 is not limited to the depicted order; and instead, the method 600 may be performed in any suitable order. In addition, although the sensor data verification system 101 is described as performing the method 600, it should be understood that the method 600 may be performed by any suitable computing device.

Referring now to FIG. 6, after identifying potentially hazardous conditions and sending notifications to a user associated with the insured property notifying the user of the hazardous conditions according to the method 500 of FIG. 5, at block 602, the sensor data verification system 101 may continue to monitor and analyze new sensor data to determine whether actions have been taken to mitigate damage to the insured property based on the provided recommendations. Monitoring sensor data after a recommendation to address a hazardous condition has been sent enables the sensor data verification system 101 to determine that the user has taken an action to mitigate potential damage associated with the hazardous condition. In some embodiments, the data capture frequency value of the sensors may be adjusted (e.g., increased) after a recommendation has been made such that the sensor data verification system 101 may determine the amount of time taken before actions to mitigate the damage were initiated. For instance, using the broken sprinkler head example from above, after notifying the user of the hazardous condition (e.g., the broken sprinkler head), new sensor data from a pressure sensor may indicate that pressure has been restored. Further, sound data from a sound sensor may indicate that water is no longer running in the backyard. Based on the new sensor data, the sensor data verification system 101 may determine that actions have been taken to mitigate damage associated with the detected hazardous condition (e.g., sprinkler head has been repaired). In some embodiments, prior to determining that the sprinkler head is broken, the pressure sensor may be configured to capture and send pressure data to the sensor data verification system 101 every 6 hours. However, after determining that the broken sprinkler head is a hazardous condition and sending a recommendation to address the hazardous condition, the data capture frequency value of the pressure sensor and/or the sound sensor may be increased to capture and send data to the sensor data verification system 101 every 15 minutes. In this way, the sensor data verification system 101 may more accurately determine if and/or when actions were taken to mitigate potential damage to the insured property. In some embodiments, the new sensor data may be similar to the previously received sensor data that was indicative of a hazardous condition. That is, in some cases, the user will not respond to the recommendations to address certain aspects of the insured property, and thus, the new sensor data may still indicate that a hazardous condition is present.

If the new sensor data indicates that the user has not taken action based on the provided recommendations, the sensor data verification system 101 may, at block 604, send an additional notification with an additional indication that action should be taken within a threshold amount of time to mitigate potential damage to the insured property. The additional notification may also include recommendations and/or indications to respond and/or address the identified hazardous condition to avoid changes to an existing insurance policy. Further, at block 602, the sensor data verification system 101 may continue monitoring sensor data from the various sensors until a determination is made that the user has taken action to address the identified hazardous conditions.

Upon determining that the user has taken action based on the provided recommendations, the sensor data verification system 101 may, at block 606, determine an amount of time taken by a user to respond to the recommendations and/or address the identified hazardous conditions. For instance, using sensor data detected from a gas sensor disposed within the property, the sensor data verification system 101 may identify a stove being left on as a hazardous condition and may send a recommendation to turn off the stove to mitigate potential damage. The sensor data verification system 101 may then receive new sensor data indicating that the stove has been turned off (e.g., actions have been taken to address the hazardous condition), and the sensor data verification system 101 may record the amount of time taken for the user to turn off the stove (e.g., responded within 5 minutes, responded within 1 hour). The amount of time taken by a user to respond to the hazardous condition may be associated with an amount of risk that the individual lives his life with, which in turn, can be used to modify or offer insurance products, as described in greater detail below.

At block 608, the sensor data verification system 101 may retrieve an insurance policy associated with the insured property 300. The insurance policy may be indicative of types of damage covered, deductible amounts, premium amounts, coverage limits, and the like. The sensor data verification system 101 may analyze the current insurance policy to determine whether any of the hazardous conditions may be covered by the policy. After retrieving the insurance policy, at block 610, the sensor data verification system 101 may determine a risk level associated with the manner in which the user lives (e.g., user's behavior) based on the amount of time taken to address and/or fix the hazardous conditions. Longer times to address hazardous conditions (e.g., waiting past the recommended threshold amount of time) may be associated with increased levels of risk because the user does not respond in a timely manner to the recommendations to address the hazardous conditions. Shorter times to address hazardous conditions (e.g., taking action within the allotted time frame prescribed by the recommendations) may be associated with decreased levels of risk because the user quickly responds and addresses the hazardous conditions. As noted above, in some embodiments, sensor data may indicate that the user has not yet taken action to address the hazardous conditions (e.g., ignored the recommendations), and such behavior may be also be associated with increased levels of risk.

At block 612, the sensor data verification system 101 may send a notification to a computing device associated with a policy holder of the existing insurance policy. Similar to the notification sent in block 510 of FIG. 5, the notification may cause the computing device to automatically open an application and display a visualization. The visualization may include a warning message indicating that the user's detected behavior is associated with a determined amount of risk. The warning message may also include an indication to respond to certain hazardous condition recommendations within the prescribed time threshold to avoid changes to an existing insurance policy.

At block 614, the sensor data verification system 101 may modify and/or update an existing insurance policy based on the determined amount of risk associated with the user's behavior. Higher risk levels may be associated with increased costs, while lower risk levels may be associated with decreased costs. For example, upon determining that the user's behavior is associated with a high level of risk based on the user not taking action within the recommended time threshold, the sensor data verification system 101 may modify the existing insurance policy by increasing the premium and/or decreasing the amount of coverage provided. Upon determining that the user's behavior is associated with a low level of risk based on the user taking action within the recommended time threshold, the sensor data verification system 101 may modify the exiting insurance policy by decreasing the premium and/or increasing the amount of coverage provided. In some embodiments, the sensor data verification system 101 may modify the existing insurance policy based on a single action taken by the user for a particular hazardous condition (e.g., taking action within the recommended threshold, ignoring the recommendation). In other embodiments, the sensor data verification system 101 may determine to modify the existing insurance policy based on the user responding in a certain way (e.g., taking action within the prescribed time, taking action after the prescribed time, not taking any action) a threshold number of times. That is, for user behaviors associated with a high risk level, the sensor data verification system 101 may not modify the existing insurance policy until the user ignores or does not timely respond to three or more recommendations. Similarly, for user behaviors associated with a low risk level, the sensor data verification system 101 may not modify the existing insurance policy until the user timely responds to three or more recommendations. In some embodiments, the sensor data verification system 101 may also offer new insurance products or services based on the detected risk level associated with the user's behavior. That is, the user may not have an existing insurance policy associated with certain aspects of the property, and the sensor data verification system 101 may use the detected data and determined risk level to provide and/or insurance products based on the determined risk level.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
 a plurality of sensor devices configured to acquire data related to a property;
 a processor configured to:
  receive the data from the plurality of sensor devices;
  identify one or more hazardous conditions for the property based on the data;
  determine an amount of risk associated with the one or more hazardous conditions;
  initiate verification operations to confirm the one or more hazardous conditions in response to determining that the amount of risk associated with the one or more hazardous conditions exceeds a first threshold value;
  send a notification to a computing device associated with the property in response to determining that the amount of risk associated with the one or more hazardous conditions exceeds a second threshold value, wherein the notification is configured to be displayed on a display of the computing device, and wherein the notification comprises one or more recommendations to address the one or more hazardous conditions;
  identify one or more actions performed by a user to address the one or more hazardous conditions;
  determine an amount of time taken by the user to perform the one or more actions;
  identify an insurance policy associated with the user and the property; and
  update the insurance policy based on the amount of time.

2. The system of claim 1, wherein the plurality of sensor devices comprises a first set of sensor devices configured to be disposed inside the property and a second set of sensor devices configured to be disposed outside of the property, and where the one or more hazardous conditions are determined based on:
 a first dataset related to a condition inside of the property, wherein the first dataset is acquired by the first set of sensor devices; and
 a second dataset related to an additional condition outside of the property, wherein the second dataset is acquired by the second set of sensor devices.

3. The system of claim 1, wherein the first threshold value is less than the second threshold value.

4. The system of claim 1, wherein each of the one or more recommendations comprises an indication to address the one or more hazardous conditions within a threshold amount of time.

5. The system of claim 4, wherein the processor is configured to modify the insurance policy based on determining that the user has not performed an action within the threshold amount of time.

6. The system of claim 1, wherein the processor is configured to send an additional notification to the computing device associated with the user in response to determining that the user has not taken an action to address the one or more hazardous conditions, wherein the additional notification comprises an additional recommendation to take action to avoid a change to the insurance policy associated with the user.

7. The system of claim 1, wherein the processor is configured to receive the data from the plurality of sensor devices according to a data capture frequency value.

8. The system of claim 1, wherein the plurality of sensor devices comprise a motion sensor, a temperature sensor, a humidity sensor, a gas detection sensor, a smoke detector sensor, a water pressure sensor, a water flow sensor, a water detection sensor, a wind speed sensor, an air pressure sensor, an electrical system sensor, a structural sensor, an environmental sensor, a weather detection sensor, a camera sensor, or any combination thereof.

9. The system of claim 1, wherein the verification operations comprise capturing additional data associated with the property via a drone.

10. A non-transitory, computer-readable medium comprising computer-executable instructions configured to, when executed, cause a processor to:
receive data related to a property from a plurality of sensor devices configured to acquire the data;
identify one or more hazardous conditions for the property based on the data;
determine an amount of risk associated with the one or more hazardous conditions;
initiate verification operations to confirm the one or more hazardous conditions in response to determining that the amount of risk associated with the one or more hazardous conditions exceeds a first threshold value;
send a notification to a computing device associated with the property in response to determining that the amount of risk associated with the one or more hazardous conditions exceeds a second threshold value, wherein the notification is configured to be displayed on a display of the computing device, and wherein the notification comprises one or more recommendations to address the one or more hazardous conditions;
identify one or more actions performed by a user to address the one or more hazardous conditions;
determine an amount of time taken by the user to perform the one or more actions;
identify an insurance policy associated with the user and the property; and
update the insurance policy based on the amount of time.

11. The non-transitory computer-readable medium of claim 10, wherein the plurality of sensor devices comprises a first set of sensor devices configured to be disposed inside the property and a second set of sensor devices configured to be disposed outside of the property, and where the one or more hazardous conditions are determined based on:
a first dataset related to a condition inside of the property, wherein the first dataset is acquired by the first set of sensor devices; and
a second dataset related to an additional condition outside of the property, wherein the second dataset is acquired by the second set of sensor devices.

12. The non-transitory computer-readable medium of claim 11, wherein the processor is configured to parse the data from the plurality of sensor devices based on a type of sensor of the first set of sensor devices or the second set of sensor devices.

13. The non-transitory computer-readable medium of claim 10, wherein the processor is configured to send an additional notification to the computing device associated with the user in response to determining that the user has not taken an action to address the one or more hazardous conditions, wherein the additional notification comprises an additional recommendation to take action to avoid a change to the insurance policy associated with the user.

14. The non-transitory computer-readable medium of claim 10, wherein each of the one or more recommendations comprises an indication to address the one or more hazardous conditions within a threshold amount of time, and wherein the processor is configured to modify the insurance policy based on determining that the user has not performed an action within the threshold amount of time.

15. The non-transitory computer-readable medium of claim 10, wherein the processor is configured to:
capture the data from the plurality of sensor devices according to a data capture frequency value; and
modify the data capture frequency value in response to identifying the one or more hazardous conditions.

16. The non-transitory computer-readable medium of claim 10, wherein the verification operations comprise capturing additional data associated with the property via a drone.

17. A method, comprising:
receiving, via a processor, data related to a property from a plurality of sensor devices configured to acquire the data, wherein the plurality of sensor devices comprises a first set of sensor devices disposed inside the property and a second set of sensor devices disposed outside of the property;
identifying, via the processor, one or more hazardous conditions for the property based on the data;
determining, via the processor, an amount of risk associated with the one or more hazardous conditions;
initiating, via the processor, verification operations to confirm the one or more hazardous conditions in response to determining that the amount of risk associated with the one or more hazardous conditions exceeds a first threshold value;
sending, via the processor, a notification to a computing device associated with a user associated with the property in response to determining that the amount of risk associated with the one or more hazardous conditions exceeds a second threshold value, wherein the notification is configured to be displayed on a display of the computing device, and wherein the notification comprises one or more recommendations to address the one or more hazardous conditions;
identifying, via the processor, one or more actions performed by a user to address the one or more hazardous conditions;
determining, via the processor, an amount of time taken by the user to perform the one or more actions;
identifying, via the processor, an insurance policy associated with the user and the property; and
updating, via the processor, the insurance policy based on the amount of time.

18. The method of claim 17, wherein the verification operations comprise:
capturing additional data associated with the property via a drone; and
confirming the one or more hazardous conditions based on the additional data captured via the drone.

19. The method of claim 17, comprising:
capturing, via the processor, the data from the plurality of sensor devices according to a data capture frequency value; and
modifying, via the processor, the data capture frequency value in response to identifying the one or more hazardous conditions.

20. The method of claim 17, comprising sending, via the processor, an additional notification to the computing device associated with the user in response to determining that the user has not taken an action to address the one or more hazardous conditions, wherein the additional notification comprises an additional recommendation to take action to avoid a change to the insurance policy associated with the user.

* * * * *